(12) United States Patent
Li et al.

(10) Patent No.: US 11,145,035 B2
(45) Date of Patent: Oct. 12, 2021

(54) METHOD FOR RAPIDLY DEHAZING UNDERGROUND PIPELINE IMAGE BASED ON DARK CHANNEL PRIOR

(71) Applicant: China University of Mining & Technology, Beijing, Haidian District (CN)

(72) Inventors: Ce Li, Beijing (CN); Feng Yang, Beijing (CN); Tan He, Haidian District (CN)

(73) Assignee: China University of Mining & Technology, Beijing, Beijing (CN)

( * ) Notice: Subject to any disclaimer, the term of this patent is extended or adjusted under 35 U.S.C. 154(b) by 0 days.

(21) Appl. No.: 16/901,093

(22) Filed: Jun. 15, 2020

(65) Prior Publication Data
US 2020/0394767 A1 Dec. 17, 2020

(30) Foreign Application Priority Data
Jun. 17, 2019 (CN) .......................... 201910520930.2

(51) Int. Cl.
*G06T 5/00* (2006.01)
*G06T 5/20* (2006.01)

(52) U.S. Cl.
CPC .............. *G06T 5/003* (2013.01); *G06T 5/009* (2013.01); *G06T 5/20* (2013.01); *G06T 2207/10024* (2013.01); *G06T 2207/30184* (2013.01)

(58) Field of Classification Search
None
See application file for complete search history.

(56) References Cited

U.S. PATENT DOCUMENTS 7,639,291 B2 * 12/2009 Lim ....................... H04N 5/361
348/243
9,560,294 B2 * 1/2017 Beck ................... H01L 27/1464
(Continued)

FOREIGN PATENT DOCUMENTS

CN 103942758 * 2/2017
CN 109743879 * 2/2021

OTHER PUBLICATIONS

He, Kaiming, Jian Sun, and Xiaoou Tang. "Single image haze removal using dark channel prior." IEEE transactions on pattern analysis and machine intelligence 33.12 (2010): 2341-2353. (Year: 2010).*
Lee et al., A review on dark channel prior based image dehazing algorithms, Lee et al. EURASIP Journal on Image and Video Processing (2016) 2016:4 (Year: 2016).*
(Continued)

*Primary Examiner* — Andrae S Allison
(74) *Attorney, Agent, or Firm* — Jason T. Daniel; Daniel Law Offices, P.A.

(57) ABSTRACT

The present invention proposes a method for rapidly dehazing an underground pipeline image based on dark channel prior (DCP). The method includes: preprocessing a hazy underground pipeline image to obtain a dark channel image corresponding to the hazy image; average-filtering the obtained dark channel image to estimate an image transmittance; compensating an offset value for an average filtering result to obtain a rough estimate of the transmittance; using a pixel value of the original image and an average-filtered image to estimate a global atmospheric light value; and using a physical restoration model to restore a dehazed image. The method of the present invention realizes the timeliness of the algorithm while ensuring the dehazing effect, and is suitable for scientific fields such as video monitoring of underground pipeline environment and identification of underground pipeline defects.

1 Claim, 2 Drawing Sheets

(56) References Cited

U.S. PATENT DOCUMENTS

| | | | | |
|---|---|---|---|---|
| 9,628,730 | B2* | 4/2017 | Vanhoff | H04N 5/361 |
| 10,290,081 | B2* | 5/2019 | Hong | G06T 5/003 |
| 2001/0028392 | A1* | 10/2001 | Yamamoto | H04N 5/361 |
| | | | | 348/207.99 |
| 2004/0090547 | A1* | 5/2004 | Takeda | H04N 5/361 |
| | | | | 348/241 |
| 2014/0355903 | A1* | 12/2014 | Sawada | G06T 5/002 |
| | | | | 382/263 |
| 2015/0304524 | A1* | 10/2015 | Toda | H04N 1/58 |
| | | | | 382/167 |
| 2016/0189354 | A1* | 6/2016 | Kikuchi | G06T 7/136 |
| | | | | 382/167 |
| 2016/0196637 | A1* | 7/2016 | Nguyen | H04N 9/646 |
| | | | | 348/224.1 |
| 2017/0053384 | A1* | 2/2017 | Toda | H04N 5/2256 |
| 2018/0122056 | A1* | 5/2018 | Kurihara | G06T 5/002 |
| 2018/0232862 | A1* | 8/2018 | Fujikawa | H04N 1/6086 |

OTHER PUBLICATIONS

Hassan, Haseeb, Bin Luo, Qin Xin, Rashid Abbasi and Waqas Ahmad. "Single Image Dehazing from Repeated Averaging Filters." 2019 IEEE 8th Joint International Information Technology and Artificial Intelligence Conference (ITAIC) (2019): 1053-1056. (Year: 2019).*

Peng, Yan-Tsung, Kerning Cao, and Pamela C. Cosman. "Generalization of the dark channel prior for single image restoration." IEEE Transactions on Image Processing 27.6 (2018): 2856-2868. (Year: 2018).*

Tyagi et al., Fog Image Restoration Using Dark Channel Prior Model with Gamma Transformation and Bilateral Filtering, International Journal of Computer Sciences and EngineeringOpen Access, 2015 (Year: 2015).*

Anan, S.; Khan, M.I.; Kowsar, M.M.S.; Deb, K.; Dhar, P.K.; Koshiba, T. Image Defogging Framework Using Segmentation and and the Dark Channel Prior. Entropy 2021, 23, 285. https://doi.org/10.3390/e23030285 (Year: 2021).*

* cited by examiner

| Image Resolution | Average Processing Time |
|---|---|
| 768 × 576 | 53 ms |
| 1920 × 1080 | 102 ms |

METHOD FOR RAPIDLY DEHAZING UNDERGROUND PIPELINE IMAGE BASED ON DARK CHANNEL PRIOR

TECHNICAL FIELD

The present invention relates to the field of image processing, and in particular to a method for rapidly dehazing an underground pipeline image based on dark channel prior (DCP).

BACKGROUND

The images showing the interior of urban underground pipelines acquired by the pipeline defect detection robot play an important role in the identification of pipeline defects. However, due to the complex pipeline environment and various adverse conditions such as shading, reflection and water mist in the pipelines, the acquired images appear to have low contrast and blurred details, etc. These degradation phenomena affect the normal operation of the vision system of the pipeline detection robot, so it is necessary to dehaze and restore the acquired images.

At present, the study of image dehazing is mainly based on image enhancement and based on physical models. The image enhancement-based dehazing method is mainly aimed at degraded images. The image processing method is used to improve the contrast of the image, highlight the features of the image and improve the visual effect of the image so that the computer vision system can analyze and process the image. However, this method does not consider the degradation process of the hazy image, so it can only improve the clarity of the image to a limited extent, which is not convenient for the subsequent processing of the image by the computer vision system. The physical model-based dehazing method can effectively deal with the existing single image, and the restored image is close to the original scene, with obvious features and good visual effects.

The dark channel prior (DCP) is one of the significant dehazing methods based upon the observation of the key features of the haze-free images, that is, each of the local regions of most outdoor haze-free images contains some pixels with very low intensities in at least one color channel. Urban underground pipelines are in a dark or weak light environment, and the acquisition of the internal images of the pipelines by the robot depends on the own light source of the robot. This leads to the fact that the acquired pipeline images usually have a large reflective area, which makes the original dark channel dehazing algorithm poor in the dehazing effect in the underground pipeline scenes.

The DCP dehazing algorithm has achieved a good dehazing effect in outdoor scenes. However, this algorithm uses soft matting to refine the transmittance, resulting in the high complexity, which cannot meet the requirements of video stream processing and cannot be used for real-time dehazing.

SUMMARY

In view of the above-mentioned problems in the prior art, the present invention proposes a method for rapidly dehazing an underground pipeline image based on DCP. This method effectively improves the clarity of the hazy underground pipeline image and meets the requirements for timeliness. The improved algorithm has lower complexity, which is beneficial for subsequent pipeline image processing. This method can be used in scientific fields such as video monitoring of underground pipeline environment and identification of underground pipeline defects.

In order to achieve the above objective, the present invention adopts the following technical solution:

The present invention provides a method for rapidly dehazing an underground pipeline image based on DCP, including the following steps:

step (1): preprocessing an original hazy underground pipeline image to obtain a dark channel image corresponding to the original hazy underground pipeline image, and using the obtained dark channel image to eliminate a factor affecting an atmospheric light value in the hazy image;

step (2): average-filtering the dark channel image obtained in step (1) to estimate an image transmittance;

step (3): compensating an offset value for an average filtering result in step (2) to obtain a rough estimate of the transmittance;

step (4): deriving an expression for estimating the transmittance according to the average filtering in step (2) and the rough estimate of the transmittance in step (3);

step (5): using a pixel value of the original hazy underground pipeline image and an average-filtered image in step (2) to estimate a global atmospheric light value;

step (6): using a physical restoration model to restore a dehazed image.

The method of the present invention improves the clarity of the hazy underground pipeline image, and realizes the timeliness of the algorithm while ensuring the dehazing effect.

BRIEF DESCRIPTION OF DRAWINGS

The present invention is described in more detail with reference to the accompanying drawings and examples.

DETAILED DESCRIPTION

To make the objectives, technical solutions and advantages of the present invention clearer and more comprehensible, the present invention is described in more detail with reference to the accompanying drawings and examples, but these examples should not be construed as a limitation to the present invention.

Figure 1:
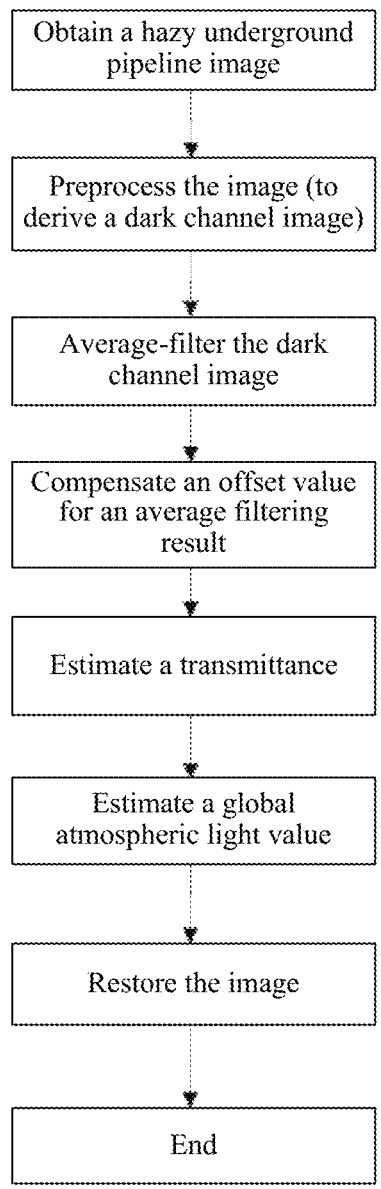
FIG. 1 is a flowchart according to an example of the present invention.

As shown in FIG. 1, a method for rapidly dehazing an underground pipeline image based on DCP specifically includes the following steps:

S1.1: An original hazy underground pipeline image is preprocessed to obtain a dark channel image corresponding to the original hazy image, and the obtained dark channel image is used to eliminate a factor affecting an atmospheric light value in the hazy image. In this example, a DCP algorithm is used to preprocess the hazy image. The DCP algorithm is concluded based on the statistics of multiple haze-free images. Specifically, in local regions other than a sky region in most haze-free images, some pixels have at least one color channel with a very low value. In other words, the minimum value of the local regions in most haze-free images except the sky region is a very small number. A minimum value of three color channels of the original hazy underground pipeline image is solved as follows:

$$M(x) = \min_{c \in \{r,g,b\}} (H^c(x)) \tag{1}$$

In the formula, H represents the original hazy underground pipeline image; $H^c$ represents a color channel of H; $\{r,g,b\}$ represents red, green and blue channels; $H^c(x)$ represents a value of a color channel of a single pixel in the original hazy underground pipeline image; M(x) is a dark channel image of the original hazy underground pipeline image H.

S1.2: The DCP algorithm is an image dehazing algorithm based on a physical model, which is a classic atmospheric scattering model expressed as follows:

$$H(x) = F(x)t(x) + A(1-t(x)) \tag{2}$$

In the formula, x is a spatial coordinate of a pixel in the original hazy underground pipeline image; H is the original hazy underground pipeline image; F is a dehazed underground pipeline image; t(x) is a transmittance, which describes a proportion of reflected light of an object that can reach an observation point through attenuation; A is a global atmospheric light value, which is usually assumed to be a global constant, regardless of the spatial coordinate x.

It is derived from the atmospheric scattering model that $A(1-t(x)) \leq H(x)$, which is rewritten as $$t(x) \geq 1 - \frac{M(x)}{A_0},$$

where $A_0$ is a minimum of the atmospheric light value in the three color channels.

S2.1: The dark channel image M(x) of the original hazy underground pipeline image H(x) is average-filtered to estimate the transmittance.

$$\text{average}_{S_a}\left(1 - \frac{M(x)}{A_0}\right) = 1 - \frac{M_{ave}(x)}{A_0} = 1 - \frac{\sum_{y \in \Omega(x)} M(y)}{A_0 S_a^2} \tag{3}$$

In the formula, $\text{average}_{S_a}(\bullet)$ represents average filtering performed by using an $S_a$ window; $M_{ave}(x)$ represents average filtering performed by using an $S_a$ window on the dark channel image M(x) corresponding to the original hazy underground pipeline image; $S_a$ represents the size of the average filtering window; $\Omega(x)$ is an $S_a \times S_a$ neighborhood of the spatial coordinate x; M(y) is a pixel in the $S_a \times S_a$ neighborhood of the spatial coordinate x in the dark channel image corresponding to the original hazy underground pipeline image. Compared with other filtering methods, average filtering has a faster execution speed, and reduces the complexity of the dehazing algorithm as much as possible on the basis of ensuring the dehazing effect.

S3.1: An average filtering result can reflect the general trend of t(x), but it certainly has an absolute difference from the real t(x). Therefore, an offset value δ is compensated for the average filtering result in S2.1 to obtain a rough estimate of the transmittance.

$$t\%(x) = 1 - \delta \frac{M_{ave}(x)}{A_0} \tag{4}$$

In the formula, $t\%(x)$ is the rough estimate of the transmittance, $\delta = \rho m_{av}$; ρ is an adjustable parameter, $0 \leq \rho \leq 1/m_{av}$; $m_{av}$ is an average of all pixels in M(x). If the range of the dark channel image M(x) of the original hazy underground pipeline image H is [0,255], it is necessary to reduce the average of all elements in M(x) by 255 times, so that $m_{av}$ is constrained within [0,1].

S3.2: In order to prevent the dehazed image from appearing too dark or bright overall, an upper limit of δ is set to 0.9. If δ is too small, the transmittance will be too large, and the residual haze will be excessive in the finally restored image to make the whole image too white. If δ is too large, the transmittance will be too small, and the finally restored image will appear too dark overall. The offset value is expressed by:

$$\delta = \min(\rho m_{av}, 0.9)$$

S4.1: According to the formulas in S2.1 and S3.2, the transmittance t(x) is expressed as follows:

$$t(x) = \max\left(1 - \min(\rho m_{av}, 0.9)\frac{M_{ave}(x)}{A_0}, 1 - \frac{M(x)}{A_0}\right) \tag{5}$$

S4.2: L(x)=A(1−t(x)), where A is the global atmospheric light value; L(x) is an ambient light value; t(x) is the transmittance. According to the transmittance formula in S4.1, the ambient light value L(x) is expressed by:

$$L(x) = \min(\min(\rho m_{av}, 0.9) M_{ave}(x), M(x)) \tag{6}$$

S5.1: The global atmospheric light value is estimated by using a pixel value of the original hazy underground pipeline image and an average-filtered image:

$$A = \varepsilon \max\left(\max_{c \in \{r,g,b\}} (H^c(x))\right) + (1 - \varepsilon) \max(M_{ave}(x)) \tag{7}$$

In the formula, $0 \leq \varepsilon \leq 1$ is an empirical constant. It is verified through a test that the effect is better when ε=0.5.

S6.1: After the ambient light value L(x) and the global atmospheric light value A are estimated, the dehazed underground pipeline image is restored by using a physical restoration model:

$$F(x) = \frac{H(x) - L(x)}{1 - \frac{L(x)}{A}} \tag{8}$$

In the formula, F(x) is the dehazed underground pipeline image.

Figures 2, 3:
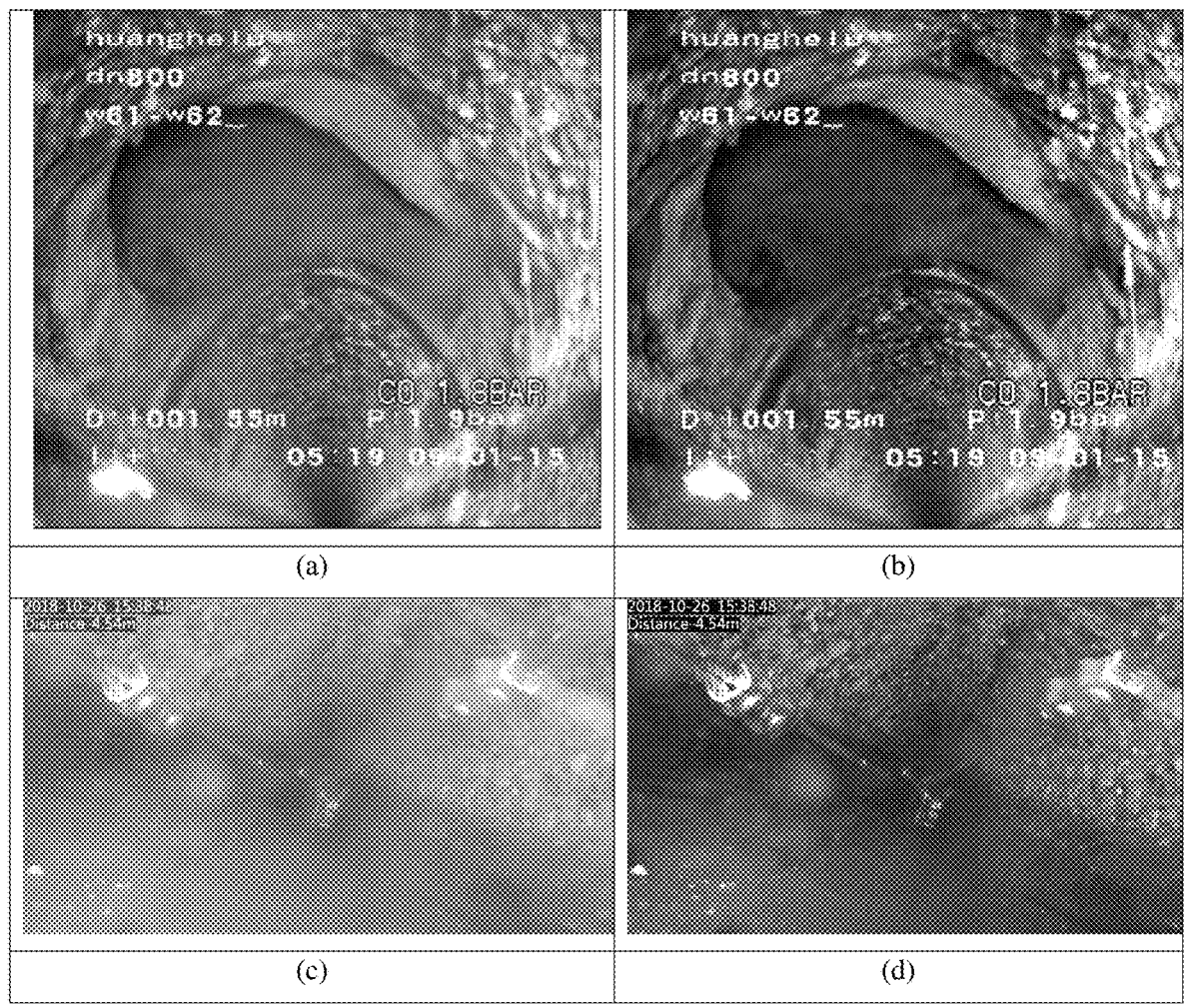
FIG. 2 shows a comparison of a dehazing effect according to an example of the present invention.
FIG. 3 shows a comparison of a dehazing time of a hazy underground pipeline image with different resolutions according to an example of the present invention.

S7.1: FIG. 2 shows a comparison of a dehazing effect of an underground pipeline image. FIG. 2(b) shows a dehazing effect of FIG. 2(a), and FIG. 2(d) shows a dehazing effect of FIG. 2(c). As can be seen from FIG. 2 that the present invention effectively improves the clarity and contrast of the underground pipeline image.

S7.2: FIG. 3 shows a comparison of a dehazing time of a hazy underground pipeline image with different resolutions. As can be seen from FIG. 3 that the present invention performs average filtering to estimate the ambient light value and the global atmospheric light value, which improves the timeliness of the method while ensuring the dehazing effect.

The specific examples described herein are merely intended to illustrate the spirit of the present invention. A person skilled in the art can make various modifications or supplements to the specific examples described or replace them in a similar manner, but it may not depart from the spirit of the present invention or the scope defined by the appended claims.

What is claimed is:

1. A method for rapidly dehazing an underground pipeline image based on dark channel prior (DCP), comprising the following steps:

step (1): preprocessing an original hazy underground pipeline image to obtain a dark channel image corresponding to the hazy image, and using the obtained dark channel image to eliminate a factor affecting an atmospheric light value in the hazy image, wherein the corresponding dark channel image is obtained by solving a minimum value of three color channels of the original hazy underground pipeline image:

$$M(x) = \min_{c \in \{r,g,b\}} (H^c(x)) \qquad (1)$$

wherein, H represents the original hazy underground pipeline image; $H^c$ represents a color channel of H; $\{r,g,b\}$ represents red, green and blue channels; $H^c(x)$ represents a value of a color channel of a single pixel in the original hazy underground pipeline image; M(x) is a dark channel image of the original hazy underground pipeline image H;

step (2): average-filtering the corresponding dark channel image M(x) of the original hazy underground pipeline image to estimate a transmittance by:

$$\text{average}_{S_a}\left(1 - \frac{M(x)}{A_0}\right) = 1 - \frac{M_{ave}(x)}{A_0} = 1 - \frac{\sum_{y \in \Omega(x)} M(y)}{A_0 S_a^2} \qquad (2)$$

wherein, $A_0$ is a minimum of the atmospheric light value in the three color channels; $\text{average}_{S_a}(\cdot)$ represents average filtering performed by using an $S_a$ window; $S_a$ represents the size of the average filtering window; M(x) is the dark channel image of the original hazy underground pipeline image H(x); $M_{ave}(x)$ represents average filtering performed by using an $S_a$ window on the dark channel image M(x) corresponding to the original hazy underground pipeline image; $\Omega(x)$ is an $S_a \times S_a$ neighborhood of a spatial coordinate x; M(y) is a pixel in the $S_a \times S_a$ neighborhood of the spatial coordinate x in the dark channel image corresponding to the original hazy underground pipeline image;

step (3): compensating an offset value for an average filtering result to obtain a rough estimate of the transmittance by:

$$t\%(x) = 1 - \delta \frac{M_{ave}(x)}{A_0} \qquad (3)$$

$$\delta = \rho m_{av} \qquad (4)$$

wherein, $t\%(x)$ is the rough estimate of the transmittance; $\rho$ is an adjustable parameter, $0 \leq \rho \leq 1/m_{av}$; $m_{av}$ is an average of all pixels in the dark channel image M(x);

in order to prevent a dehazed image from appearing too dark or bright overall, after an offset value is compensated, an upper limit of $\delta$ is set to 0.9, and $\delta$ is further expressed as:

$$\delta = \min(\rho m_{av}, 0.9) \qquad (5)$$

step (4): expressing the transmittance t(x) according to Formulas (3), (4) and (5) as follows:

$$t(x) = \max\left(1 - \min(\rho m_{av}, 0.9)\frac{M_{ave}(x)}{A_0}, 1 - \frac{M(x)}{A_0}\right) \qquad (6)$$

wherein, it is derived from a physical model of hazy image degradation that L(x)=A(1−t(x)), A being the global atmospheric light value, L(x) being an ambient light value, and t(x) being the transmittance; according to Formula (6), the ambient light value L(x) is expressed by:

$$L(x) = \min(\min(\rho m_{av}, 0.9) M_{ave}(x), M(x)) \qquad (7)$$

step (5): using a pixel value of the original hazy underground pipeline image and an average-filtered image to estimate the global atmospheric light value A by:

$$A = \varepsilon \max\left(\max_{c \in \{r,g,b\}} (H^c(x))\right) + (1 - \varepsilon) \max(M_{ave}(x)) \qquad (8)$$

wherein, $\varepsilon$ is an empirical constant, which is 0.5; and step (6): using a physical restoration model to restore the dehazed underground pipeline image by:

$$F(x) = \frac{H(x) - L(x)}{1 - \frac{L(x)}{A}} \qquad (9)$$

wherein, F(x) is the dehazed underground pipeline image.

* * * * *